Dec. 1, 1936.  W. S. ROOT, JR  2,062,936

THERMOSTATICALLY OPERATED VALVE

Filed June 20, 1934

INVENTOR.
Walter Sabin Root Jr.
BY Slough and Canfield
ATTORNEY.

Patented Dec. 1, 1936

2,062,936

UNITED STATES PATENT OFFICE 2,062,936

THERMOSTATICALLY OPERATED VALVE

Walter Sabin Root, Jr., Cleveland, Ohio, assignor to The Bishop & Babcock Mfg. Company, Cleveland, Ohio, a corporation of Ohio Application June 20, 1934, Serial No. 731,487

9 Claims. (Cl. 236—34)

This invention relates to thermostatically operated valves, and particularly to thermostatically operated valves for controlling the flow rate of fluids in accordance with temperature thereof.

It is an object of my invention to provide generally an improved thermostatically operated valve device for controlling the flow rate of fluid.

Another object is to provide an improved thermostatically operated valve device of the class referred to having a flow controlling valve element which is itself of thermally responsive construction.

Another object is to provide a thermostatically operated valve device of the class referred to in which thermally effected movements of a thermostatic element are applied to valve operating purposes by mechanism means in an improved manner.

Another object is to provide, in a thermostatically operated valve construction, improved means for adjusting a flow controlling element thereof to predetermined fluid temperatures.

Other objects will be apparent to those skilled in the art to which my invention appertains.

My invention is fully disclosed in the following description taken in connection with the accompanying drawing, in which:—

Figure 1:
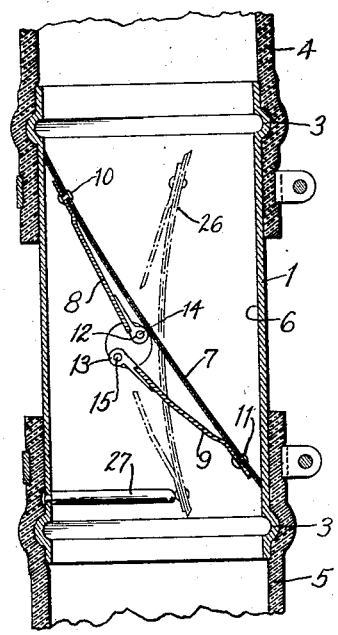
Fig. 1 is a longitudinal sectional view of an embodiment of my invention.
Figure 2:
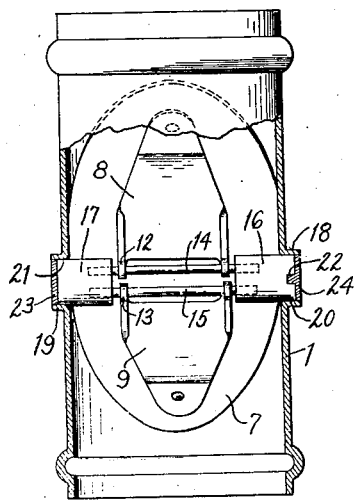
Fig. 2 is a longitudinal elevational view with parts broken away for clearness, the view being taken generally from the left-hand side of the embodiment of Fig. 1.
Figure 4:
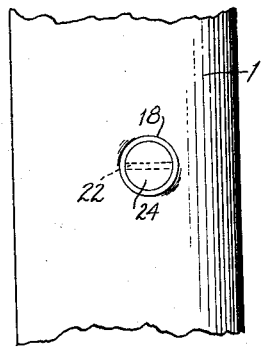
Fig. 4 is a fragmentary elevational view taken from the right hand side of Fig. 2.

Referring to the drawing, I have shown at 1 a main frame in the form of a tube providing longitudinally therethrough a tubular fluid passageway. The embodiment of my invention of Figs. 1 and 2 is contemplated to be employed to control flow of fluid through a conduit and suitable means may be provided to connect the upper and lower ends of the tube 1 in the conduit 9. Where the conduit is a flexible hose, the upper and lower ends of the tube 1 may be provided with outwardly projecting beads 3—3 over which portions 4 and 5 of a hose line conduit may be telescoped, so that fluid, whether gaseous or liquid, flowing through the hose line will flow through the tubular passageway 6 in the tube 1.

A valve element 7 of bimetal is supported in the tubular passageway 6 in a manner to be described, and is generally planar with an elliptical periphery so that in an inclined position as illustrated in Fig. 1 it may substantially close the passageway 6, and so that it may move to the dotted line position in which it is disposed generally axially of the tubular passageway 6 to permit maximum flow rate therethrough.

Arms 8 and 9 of sheet metal are riveted as at 10 and 11, respectively, to relatively widely spaced portions of the bimetallic valve element 7. The arms 8 and 9 are substantially rigid and extend generally toward each other. The inner ends thereof are provided respectively with pairs of perforated ears, respectively, 12—12 and 13—13. A pivot pin 14 is projected through the perforations of the ears 12 and a pivot 15 through the perforations of the ears 13, the ears and perforations being disposed so that the pivot pins 14 and 15 are substantially parallel and extend transversely across the passageway 6 generally at right angles to the longitudinal axis thereof and spaced laterally therefrom, the pin 15 being farther from the axis than the pin 14.

The opposite ends of the pins 14 and 15 are seated in and rigidly secured to heads 16 and 17, generally cylindrical in form. Opposite wall portions of the tube 1 are formed with outwardly projecting annular tubular projections 18 and 19 providing tubular bores 20 and 21 in which bores the heads 16 and 17 rotatably fit, and the bores 20 and 21 are substantially coaxially aligned.

One of the heads, such as the head 16, is provided with an outwardly open screw driver slot 22 by which it and the pins 14 and 15 and the head 17 may be adjustably turned in the bores 18 and 19.

In the construction and assembly of the device, the heads 16 and 17 are adjustably turned to a suitable position to be described, by a screw driver in the slot 22; and in their adjusted positions, the head 17 is rigidly fixed in the bore 19 by solder or like securing and sealing material 23, and then the bore 21 is likewise sealed with material such as solder 24 to secure the head 16 to the tube 1 and to seal the bore 20. By this means the pins 14 and 15 are rigidly secured to the tube 1 in predetermined adjusted positions such as that indicated in Figs. 1 and 2.

The above described adjustment is made at a predetermined temperature at which the bimetallic valve element 7 is slightly warped with the convex side towards the pins 14 and 15 and with the periphery of the bimetallic element in engagement with the wall of the passageway 6 as illustrated in Fig. 1. The predetermined temperature may be the temperature of fluid at which it is desired that the passageway 6 will be entirely closed.

By means of the construction above described, upon a rise of temperature of fluid, communicated to the bimetallic valve element 7, the valve element will warp to a greater degree, and reacting through the arms 8 and 9 upon the stationary pivot pins 14 and 15, will move generally clockwise as viewed in Fig. 1 with a generally pivotal movement around the pins 14 and 15 to passageway-opening positions corresponding to temperature, the flow-open or maximum warped position being indicated at 26 in dotted lines. Thus the valve element 7 will take up positions corresponding to temperature, entirely closing the passageway 6 at a predetermined low temperature and opening it the maximum amount at a predetermined high temperature.

To prevent the thermostatic valve element 7 from moving beyond the maximum flow position upon a still further rise of temperature of the fluid, a stop may be provided in the form of a post 27 extending inwardly from the wall of the tube 1 and engageable at its inner end with the valve element or with the arm 9 in said maximum flow position.

If it be desired that the rate of flow of fluid through the passageway 6 shall attain a maximum at a predetermined high temperature and then be reduced upon further rise of temperature, this may be accomplished merely by omitting the stop 27 which will allow the thermostatic valve element 7 to move beyond the position 26.

The above described operation of the valve device is predicated upon the employment of a bimetallic material for the element 7, the two metals having different coefficients of thermal expansion, and with the element so disposed that the material of greater expansion coefficient is on the side of the element adjacent the pins 14 and 15, which causes the valve element 7 to move from a position completely or greatly obstructing the passageway 6 to positions of lesser obstruction. In some cases it may be desired that the valve element 7 shall operate in the opposite manner, that is to say, moving from a position of minimum obstruction of the passageway 6 to positions of greater obstruction upon a rise of temperature of the fluid. In such cases it is only necessary to reverse the position of the bimetallic element 7, that is to say, disposing it with the material of lesser coefficient of expansion adjacent or facing the pivot pins 14 and 15. In such case, the heads 16 and 17 may initially be adjusted to cause the valve element 7 to take up the dotted line position 26 at the predetermined minimum temperature, whereby upon a rise of temperature it will move from the position 26 to or toward the solid line position of Fig. 1, ultimately entirely closing the passageway 6 when a predetermined higher temperature of fluid is reached.

Figure 3:
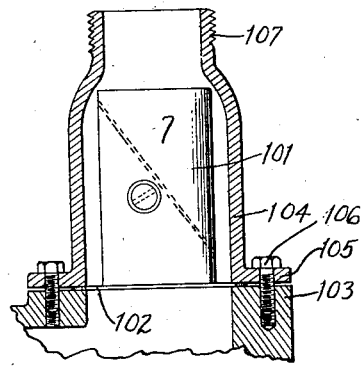
Fig. 3 is a view illustrating an embodiment of my invention in a modified form.

In Fig. 3 I have illustrated the manner in which my invention may be embodied in a valve construction sometimes referred to as the immersion type, i. e., immersed in the fluid in a conduit system or conduit means as distinguished from the form of Fig. 1 in which the passageway 6 and tube 1 form a part of the conduit itself. In this form, a tube 101 may be provided having therein the valve elements and adjusting means therefor substantially the same as those described for Figs. 1 and 2; but the lower end of the tube 101 is provided with a laterally extending preferably annular flange 102 adapted to be clamped between two joined portions of the conduit system. In the form illustrated, one said portion, 103, may be a part of a tank or box or reservoir or enlarged portion of a conduit system, and the other part 104 may be generally in the form of a tube or pipe secured to the portion 103 by a flange 105 thereon and screws 106 which clamp the flange 105 to the conduit portion 103 with the flange 102 therebetween. The outer end of the conduit portion 104 may be provided with threads 107 by which it may be connected to a continuation of the conduit system. Of course, the outer end of the portion 104 may be provided with beads such as the beads 3 of Fig. 1 or with other means for connecting it to the conduit system therebeyond.

In either of the forms illustrated and described, the flow of the fluid may be in either direction, and as stated above, may operate the valve element in either direction upon a rise of temperature.

My invention is not limited to the exact details of construction shown and described and may be embodied in structures differing from the illustrated and described embodiment without departing from the spirit of my invention and without sacrificing its advantages and within the scope of the appended claims.

I claim:

1. In a thermally responsive valve construction, a frame providing a tubular fluid flow passageway, a thermostatic valve element responsive to bend upon a change of temperature of fluid in the passageway and having spaced portions thereof pivotally connected to the tube on spaced pivot axes supported stationary relative to the frame to cause the valve element to move concurrently longitudinally and transversely of the tube around the pivot axes upon bending to variably control flow of fluid through the passageway responsive to changes of temperature of the fluid.

2. In a thermally responsive valve construction, a frame providing a tubular fluid flow passageway, a bimetallic thermostatic element responsive to bend upon a change of temperature of fluid in the passageway and having spaced portions thereof pivotally connected to the tube on spaced pivot axes supported stationary relative to the frame, to cause the valve element to move concurrently transversely and longitudinally of the tube around the pivot axes upon bending to variably control flow of fluid through the passageway responsive to changes of temperature of the fluid.

3. In a thermally responsive valve construction, a frame comprising a fluid flow conduit means, a thermostatic valve element bendable responsive to changes of temperature of fluid in the conduit means, a pair of arms extending toward each other from spaced portions of the valve element and on the same side thereof, a pair of spaced pivot supports fixed on the frame pivotally supporting the arm ends, and constituting the sole support for the valve element in the conduit means and causing the valve element to move bodily upon bending to variably control fluid flow rates through the conduit means in response to changes of fluid temperature.

4. In a thermally responsive valve construction, a frame comprising a fluid flow conduit means, a butterfly type valve element of thermostatic bimetal in the conduit means, a pair of arms extending toward each other from spaced portions of the valve element and on the same side thereof, a pair of spaced pivot supports fixed on the frame on the convex side of the bimetal valve element pivotally supporting the arm ends and constituting the sole support for the valve and causing the valve element to move bodily upon bending thereof to variably control fluid flow through the conduit means in response to changes of fluid temperature.

5. In a thermally responsive valve construction, a frame providing a fluid flow conduit means, a thermostatic valve element bendable in response to changes of temperature of fluid in the conduit means, a pair of arms extending from spaced portions of the valve element, a pair of spaced pivot supports fixed on the frame on the convex side of the valve element pivotally supporting the arm ends and constituting the sole means of support for the valve in the conduit means to cause the valve element to move concurrently transversely and longitudinally of the conduit means to variably control fluid flow rate through the conduit means in response to changes of fluid temperature, and means to adjustably relatively rotate the pivot supports about an axis to adjust the position of the valve element for a given temperature.

6. In a thermostatically operated valve device, a frame comprising a tubular passageway, a pivoted valve element in the passageway bendable responsive to changes of temperature of fluid in the passageway, a pair of spaced pivot elements fixedly supported on the frame and extending transversely across the tubular passageway at one side of the valve element, a pair of arms joined at one end to spaced portions of the valve element at opposite sides of the pivot elements and both on the same side of the valve element, and at their free ends pivotally connected to the pivot elements, and constituting the sole means of support for the valve in the passageway whereby upon bending of the thermostatic valve element in response to changes of fluid temperature in the passageway, the valve element will be concurrently transversely and longitudinally with respect to said tube rocked around the pivot elements to variably inclined positions in the passageway by a pull effected upon one arm and a thrust upon the other to correspondingly vary the fluid flow rate therethrough.

7. In a thermostatically operable valve device, a frame comprising a tubular passageway, a bimetal valve element in the passageway bendable responsive to changes of temperature of fluid therein, a pair of spaced pivot elements fixedly supported on the frame and extending transversely across the tubular passageway at one side of the valve element, a pair of arms joined at one end to spaced portions of the valve element at opposite sides of the pivot elements and both on the same side of the valve element, and at their free ends pivotally connected to the pivot elements and constituting the sole means of support for the valve element, whereby upon bending of the thermostatic valve element in response to temperature changes of fluid in the passageway, the valve element will be bodily rocked around the pivot elements by a pull effected upon one arm and a thrust upon the other to variably incline the valve element in the passageway to correspondingly vary the fluid flow rate therethrough, and adjusting means to adjustably rotate a pivot element about an eccentric axis to adjust the position of the valve element for a given fluid temperature.

8. In a thermally responsive valve construction, a frame providing a tubular fluid flow passageway, a thermostatic valve element responsive to bend upon a change of temperature of fluid in the passageway and having spaced portions thereof pivotally connected to the tube on spaced pivot axes supported stationary relative to the frame to cause the valve element to move concurrently longitudinally and transversely with respect to said tube around the pivot axes upon bending to variably control flow of fluid through the passageway responsive to changes of temperature of the fluid, and means to adjustably change the relative position of the said pivot axes to adjust the position of the valve element for a given temperature.

9. In a thermally responsive valve construction, a frame providing a tubular fluid flow passageway, a bimetallic thermostatic element responsive to bend upon a change of temperature of fluid in the passageway and having spaced portions thereof pivotally connected to the tube on spaced pivot axes supported stationary relative to the frame, to cause the valve element to move concurrently transversely and longitudinally with respect to said tube around the pivot axes upon bending to variably control flow of fluid through the passageway responsive to changes of temperature of the fluid, and means to adjustably change the positions of the fixed axes relative to each other and to the frame to adjust the position of the valve for a given temperature.

WALTER SABIN ROOT, Jr.